United States Patent
Saito et al.

(10) Patent No.: US 10,753,358 B2
(45) Date of Patent: Aug. 25, 2020

(54) POWER TRANSMISSION APPARATUS

(71) Applicant: AISIN AW CO., LTD., Anjo-shi, Aichi (JP)

(72) Inventors: Naoki Saito, Anjo (JP); Takeshi Torii, Chiryu (JP); Atsushi Chujo, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 342 days.

(21) Appl. No.: 15/743,246

(22) PCT Filed: Sep. 29, 2016

(86) PCT No.: PCT/JP2016/078879
§ 371 (c)(1),
(2) Date: Jan. 9, 2018

(87) PCT Pub. No.: WO2017/057606
PCT Pub. Date: Apr. 6, 2017

(65) Prior Publication Data
US 2018/0202438 A1 Jul. 19, 2018

(30) Foreign Application Priority Data

Sep. 29, 2015 (JP) ................. 2015-191459

(51) Int. Cl.
*F04C 15/06* (2006.01)
*F04C 2/10* (2006.01)
(Continued)

(52) U.S. Cl.
CPC .............. *F04C 15/06* (2013.01); *F04C 2/102* (2013.01); *F16H 57/0404* (2013.01);
(Continued)

(58) Field of Classification Search
CPC . B60K 2025/026; B60K 25/02; B60W 30/00; B60W 30/1819; F04C 15/06;
(Continued)

(56) References Cited

U.S. PATENT DOCUMENTS

| 6,113,360 A | 9/2000 | Yu et al. |
|---|---|---|
| 2004/0213688 A1 | 10/2004 | Tanikawa et al. |

(Continued)

FOREIGN PATENT DOCUMENTS

| GB | 2 342 398 A | 4/2000 |
|---|---|---|
| JP | H09-112459 A | 5/1997 |

(Continued)

OTHER PUBLICATIONS

English Machine Translation of JP-2014202105-A, Espacenet, translated on Jan. 31, 2020. (Year: 2014).*

(Continued)

*Primary Examiner* — Patrick Hamo
*Assistant Examiner* — Paul W Thiede
(74) *Attorney, Agent, or Firm* — Oliff PLC

(57) ABSTRACT

A power transmission apparatus includes an oil pump disposed between a hydraulic controller and a strainer. The oil pump includes a rotor (3) and a housing provided with a rotor chamber housing the rotor (3). Rotation of the rotor (3) causes oil to be sucked into an oil chamber (c1) defined by the rotor (3), and the oil is pressurized and discharged therefrom. The housing is provided with a first oil passage (71) through which oil sucked from a reservoir through the strainer flows toward the oil chamber, and a second oil passage (72) through which oil refluxed from the hydraulic controller flows toward the oil chamber. The second oil passage (72) includes a curved oil passage curved along the rotor (3) and is disposed such that the oil refluxed from the (Continued)

hydraulic controller flows in a rotation direction of the rotor (3) through the curved oil passage.

16 Claims, 7 Drawing Sheets

(51) Int. Cl.
*F16H 57/04* (2010.01)
*F16H 61/00* (2006.01)
*F16H 57/12* (2006.01)
*F16H 41/00* (2006.01)

(52) U.S. Cl.
CPC ..... *F16H 57/0441* (2013.01); *F16H 57/0446* (2013.01); *F16H 57/12* (2013.01); *F16H 61/0025* (2013.01); *F04C 2210/206* (2013.01); *F04C 2240/20* (2013.01); *F04C 2240/30* (2013.01); *F04C 2270/185* (2013.01); *F16H 41/00* (2013.01); *F16H 57/0436* (2013.01); *F16H 2061/0037* (2013.01)

(58) Field of Classification Search
CPC ............ F04C 2210/206; F04C 2240/20; F04C 2240/30; F04C 2270/185; F04C 2/102; F04C 11/001; F16H 2061/0037; F16H 41/00; F16H 57/0404; F16H 57/0436; F16H 57/0441; F16H 57/0446; F16H 57/12; F16H 61/0025; F16H 57/0434; F16H 61/00

USPC .................................. 418/15, 191, 204, 205
See application file for complete search history.

(56) References Cited

U.S. PATENT DOCUMENTS

2015/0037194 A1    2/2015   Kan et al.
2016/0207401 A1*   7/2016   Kasuya ................... F16H 61/00

FOREIGN PATENT DOCUMENTS

| | | | |
|---|---|---|---|
| JP | 2004-116358 | A | 4/2004 |
| JP | 2014-202105 | A | 10/2014 |
| JP | 2014202105 | A * | 10/2014 |
| JP | 2015-045326 | A | 3/2015 |
| JP | 2015-048726 | A | 3/2015 |
| JP | 2015-094296 | A | 5/2015 |
| JP | 2015-175266 | A | 10/2015 |
| KR | 10-0748658 | B1 | 8/2007 |
| WO | 2015/046578 | A1 | 4/2015 |

OTHER PUBLICATIONS

Jan. 10, 2017 Search Report issued in International Patent Application No. PCT/JP2016/078879.

* cited by examiner

POWER TRANSMISSION APPARATUS

TECHNICAL FIELD

The present invention relates to a vehicle power transmission apparatus to transmit a driving force from a driving source to wheels.

BACKGROUND ART

An oil pump to pressurize and discharge oil (e.g., a working fluid) by power supplied from a driving source, such as an engine, so as to supply hydraulic pressure to a hydraulic controller is widely used in power transmission apparatuses, such as automatic transmissions. Such an oil pump may include a plurality of suction ports through which oil is sucked, and may pressurize and discharge oil merged inside the oil pump.

For example, Patent Document 1 discloses an oil pump disposed between a strainer located in a lower portion of a transmission case and a hydraulic controller attached to a lateral portion of the transmission case. Oil sucked from a reservoir through the strainer and oil as an excess pressure discharged from the hydraulic controller merge inside a housing of the oil pump. The housing of the oil pump is provided with: a gear housing chamber housing an external gear and an internal gear; a suction oil passage through which oil in the reservoir is sucked from a first side of the radial direction of the external gear through the strainer; a reflux oil passage through which oil as an excess pressure discharged inside the hydraulic controller is refluxed from a second side of the radial direction; and a junction where the suction oil passage and the reflux oil passage join. Thus, when viewed in the axial direction of the rotation shaft, oil flowing from the reservoir through the suction oil passage and oil flowing from the hydraulic controller through the reflux oil passage face each other at the junction.

RELATED ART DOCUMENTS

Patent Documents

Patent Document 1: Japanese Patent Application Publication No. 2014-202105 (JP 2014-202105 A)

SUMMARY

Problem to be Solved

In the structure disclosed in Patent Document 1, however, the reflux oil passage is provided such that when viewed in the axial direction, oil refluxed from the hydraulic controller flows around the rotation axis of the external gear in a direction opposite to the rotation direction of the gear. Oil sucked from the reservoir through the strainer and oil as an excess pressure discharged inside the hydraulic controller and refluxed therefrom flow into the junction through the suction oil passage and the reflux oil passage, respectively, in directions facing each other, and thus collide with each other at the junction. This unfortunately results in oil flow disturbance. Such flow disturbance may increase suction resistance that is a cause of cavitation. An increase in suction resistance becomes an impediment to improvement in stability of discharge pressure and improvement in durability of the oil pump.

Accordingly, an object of various disclosed embodiments is to provide a power transmission apparatus capable of reducing occurrence of cavitation in a structure where oils flowing through a plurality of oil passages merge inside an oil pump.

A power transmission apparatus according to disclosed embodiments includes:
 an input shaft drivingly coupled by a driving source;
 a speed change mechanism to change a speed of rotation of the input shaft and transmit the resulting rotation;
 a hydraulic controller to adjust pressure of oil and supply the resulting oil to the speed change mechanism;
 a reservoir storing oil; and
 an oil pump including a rotor and a housing provided with a rotor chamber housing the rotor. The oil pump is configured such that rotation of the rotor causes oil as an excess pressure discharged inside the hydraulic controller and refluxed therefrom and oil sucked from the reservoir through a strainer to be sucked into a pump chamber defined by the rotor, and the oil sucked into the pump chamber is pressurized and supplied to the hydraulic controller (12).

The oil pump is disposed between the hydraulic controller and the strainer as viewed in an axial direction of the rotor.

The housing is provided with: a first oil passage through which the oil sucked through the strainer is supplied to the pump chamber; and a second oil passage through which the oil refluxed from the hydraulic controller is supplied to the pump chamber.

The second oil passage includes a curved oil passage curved along the rotor. The oil refluxed from the hydraulic controller flows in a rotation direction of the rotor through the curved oil passage.

Assuming that oil flows into a plurality of oil passages provided in the housing of the oil pump in directions facing each other, the power transmission apparatus causes the oil refluxed from the hydraulic controller to be supplied to the pump chamber defined by the rotor, with the flow of the oil directed in the rotation direction of the rotor. Thus, the oil sucked from the reservoir merges with the oil flowing from the hydraulic controller while flowing along the oil flowing from the hydraulic controller. This reduces oil flow disturbance caused by merging of the oil, resulting in improvement in stability of discharge pressure and improvement in durability of the oil pump.

BEST MODES

A power transmission apparatus PT according to an embodiment will be described below with reference to the drawings.

[Power Transmission Apparatus]

Figure 1A:
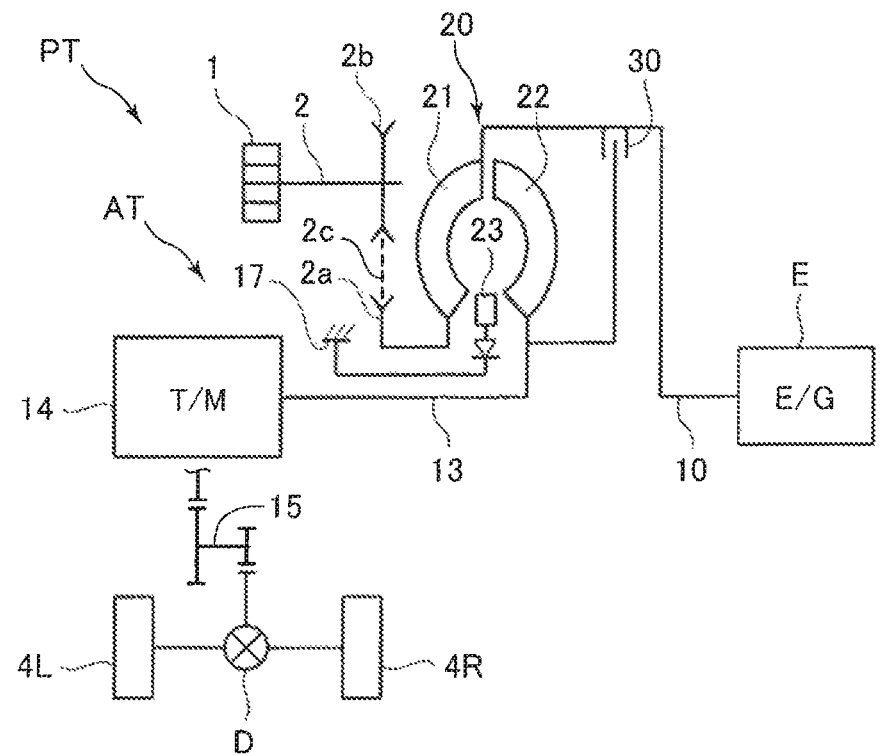
FIG. 1A is a skeleton diagram illustrating a power transmission apparatus according to an embodiment.

The power transmission apparatus PT illustrated in FIG. 1A is a vehicle driving apparatus suitable for installation on an automobile, such as a passenger car. In the present embodiment, the power transmission apparatus PT is a driving apparatus suitable for installation on an FF (front engine/front drive) type transverse engine vehicle. An engine E is, for example, an internal combustion engine, such as a gasoline engine or a diesel engine. The power transmission apparatus PT includes: an automatic transmission AT including a torque converter 20 and a speed change mechanism 14; a differential mechanism to distribute rotation output from the automatic transmission AT to right and left front wheels 4R and 4L; an oil pump 1 to be activated upon receiving power from the engine E (motor); and a hydraulic controller 12 to control the automatic transmission AT by hydraulic pressure supplied from the oil pump 1.

The torque converter 20 of the automatic transmission AT includes: a drive shaft 10 that is an input shaft drivingly coupled by an output shaft of the engine E; a pump impeller 21 that rotates together with the drive shaft 10; a turbine runner 22 to receive a driving force from the pump impeller 21 through oil serving as a working fluid, such as an automatic transmission fluid (ATF), and transmit the driving force to an input shaft 13 of the speed change mechanism 14; and a stator 23 supported by a transmission case 17 via a one-way clutch. The turbine runner 22 is in engagement with (or is locked up by) the drive shaft 10 through a lock-up clutch 30 and is thus able to directly receive power from the engine E.

The speed change mechanism 14 housed inside the transmission case 17 is a multi-stage speed change mechanism configured to achieve a plurality of shift speeds by engagement and/or disengagement of a plurality of unillustrated friction engagement devices (such as a clutch and a brake). The speed change mechanism 14 converts rotation of the input shaft 13 at a gear ratio of each shift speed and outputs the resulting rotation to a counter shaft 15 disposed in parallel with the input shaft 13. A differential D distributes the rotation received through the counter shaft 15 to the right and left front wheels 4R and 4L (wheels) via right and left axles by a planetary gear mechanism (differential gear mechanism).

A pump shaft 2 that is a rotor shaft (drive shaft) of the oil pump 1 according to the present embodiment is disposed in parallel with the input shaft 13 of the speed change mechanism 14. A driven sprocket 2b attached to the pump shaft 2 is coupled through a chain 2c to a drive sprocket 2a connected to the pump impeller 21 of the torque converter 20. The chain 2c is an example of a transmission mechanism. Alternatively, any other transmission mechanism, such as a belt or a gear train, may be used. Thus, the oil pump 1 is activated upon receiving rotation of the engine E, serving as a driving source, by chain transmission. Any other driving source may be used as long as it supplies a driving force to the pump shaft 2. The driving source may be an electric motor, for example.

Figure 1B:
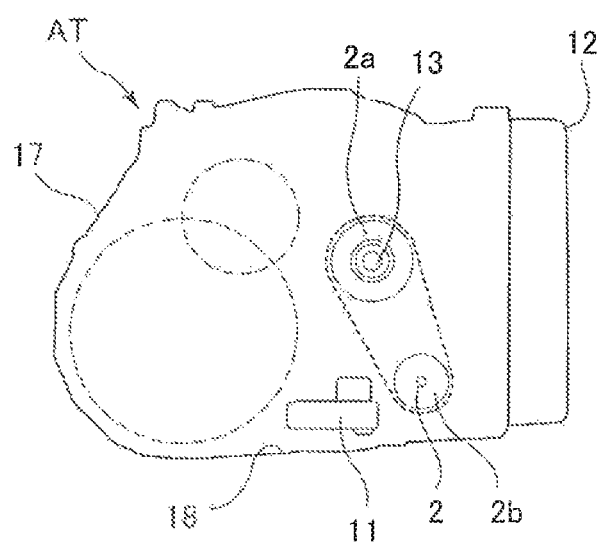
FIG. 1B is a schematic diagram illustrating the arrangement of an oil pump according to the present embodiment.

As illustrated in FIG. 1B, the hydraulic controller 12 is secured to a front lateral surface (i.e., a front surface) of the transmission case 17 in a vertical position. Note that FIG. 1B is a schematic diagram of the automatic transmission AT from which the torque converter 20 is removed, as viewed from a position where the engine E is disposed. The right side of FIG. 1B corresponds to the front of a vehicle. In one example, the hydraulic controller 12 includes a valve body internally provided with oil passages, and a plurality of solenoid valves disposed in the valve body. The hydraulic controller 12 appropriately adjusts hydraulic pressure supplied from a hydraulic pressure source (i.e., the oil pump 1), and supplies the hydraulic pressure to the automatic transmission AT or exhausts the hydraulic pressure from the automatic transmission AT. Thus, the hydraulic controller 12 causes, for example, engagement and/or disengagement of the friction engagement devices so as to carry out shift control of the speed change mechanism 14. In addition, the hydraulic controller 12 supplies oil to a lubrication target region inside the transmission case 17. As used herein, the concept of the term "hydraulic pressure source" embraces not only the mechanical oil pump 1 but also an electric oil pump to be activated upon receiving electric power from a battery of the vehicle, for example.

The oil that has lubricated the lubrication target region flows along an inner wall of the transmission case 17 and is collected into a reservoir 18 provided in a lower portion of the transmission case 17. A strainer 11 disposed in the lower portion of the transmission case 17 filters the oil stored in the reservoir 18. The filtered oil is supplied to the oil pump 1. Alternatively, instead of using the lower portion of the transmission case 17 as the reservoir, a storage device (reservoir), such as an oil pan or an oil tank, may be provided. Oil that is discharged from the oil pump 1 and then discharged from the hydraulic controller 12 and/or the torque converter 20 in the form of an excess pressure is refluxed to the oil pump 1 through an oil passage (not illustrated) connecting the hydraulic controller 12 to the oil pump 1.

[Oil Pump]

Figure 2:
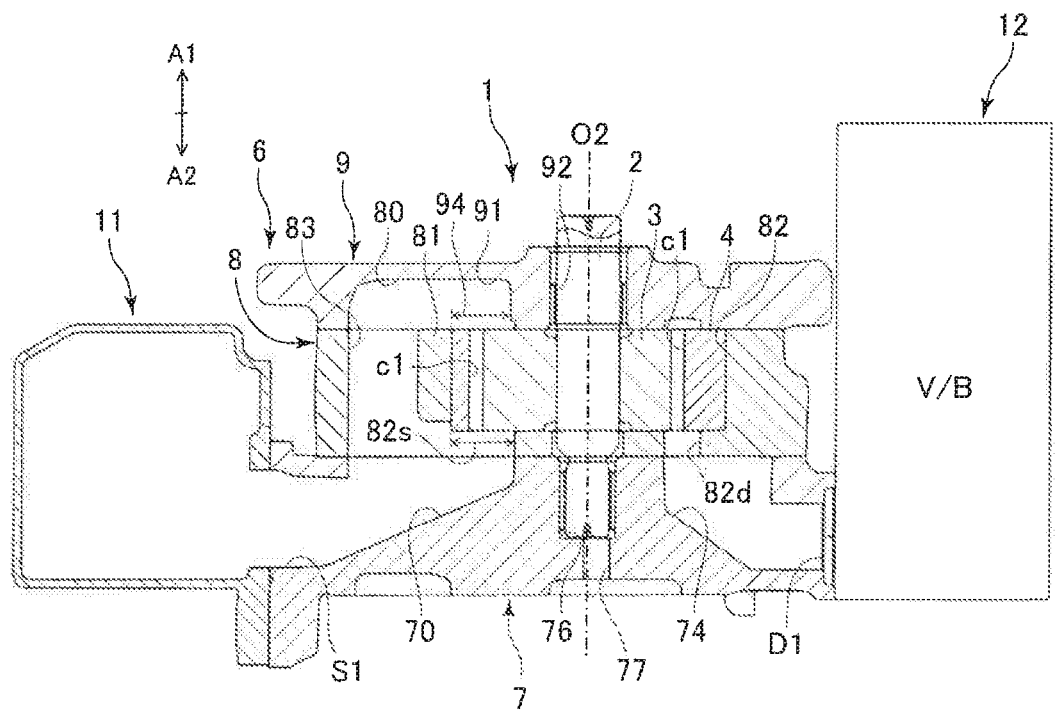
FIG. 2 is a cross-sectional view of the oil pump according to the present embodiment.

The oil pump 1 will be described below. As illustrated in FIGS. 1B and 2, the oil pump 1 is disposed in the lower portion of the transmission case 17 and is located between the strainer 11 and the hydraulic controller 12. Note that FIG. 2 is a cross-sectional view of the oil pump 1 when the automatic transmission AT illustrated in FIG. 1B is viewed from below. The torque converter 20 is disposed above the oil pump 1 in FIG. 2, and the speed change mechanism 14 is disposed below the oil pump 1 in FIG. 2. In the following description, the term "axial direction" refers to a direction in which a shaft center (i.e., a shaft axis O2) of the pump shaft 2 extends. The axial direction includes a first axial direction A1 that is a direction toward the torque converter 20, and a second axial direction A2 that is a direction opposite to the first axial direction A1.

The oil pump 1 includes: a drive gear 3 (rotor) that rotates together with the pump shaft 2 (shaft); and a driven gear 4 that rotates in accordance with rotation of the drive gear 3. The oil pump 1 is what is called an internal gear pump (trochoid pump). The drive gear 3 and the driven gear 4 respectively include external teeth and internal teeth meshing with each other. The drive gear 3 and the driven gear 4 are disposed such that the driven gear 4 is eccentric relative to the shaft axis O2. The oil pump 1 includes the pump shaft 2, the drive gear 3, the driven gear 4, and a housing 6. The housing 6 is provided with a gear housing chamber 82 (rotor chamber) that houses the drive gear and the driven gear 4.

The housing 6 is provided with: a suction port S1 through which oil in the reservoir 18 is sucked through the strainer 11; a receiving port S2 (see FIG. 3) through which oil refluxed from the hydraulic controller 12 is received; and a suction oil passage 70 through which the suction port S1 and the receiving port S2 are connected to the gear housing chamber 82. The suction port S1 corresponds to a first suction port connected to the strainer 11. The receiving port S2 corresponds to a second suction port connected to the hydraulic controller 12. The housing 6 is further provided with: a discharge port D1 through which pressure oil is discharged to the hydraulic controller 12; and a discharge oil passage 74 through which the gear housing chamber 82 is connected to the discharge port D1. Thus, in accordance with rotation of the pump shaft 2, the oil pump 1 pressurizes oil sucked through the suction port S1 and the receiving port S2 and supplies pressure oil to the hydraulic controller 12 through the discharge port D1.

The structure of the housing 6 will be described in detail below. The housing 6 includes: a pump body 8 provided with the gear housing chamber 82; a top cover 9 covering the pump body 8 from the first axial direction A1; and a bottom cover 7 (cover body) covering the pump body 8 from the second axial direction A2. As used herein, the term "bottom" of the bottom cover 7 refers to a "bottom side" that is a location adjacent to the speed change mechanism 14 in the axial direction, and the term "top" of the top cover 9 refers to a "top side" that is a location opposite to the bottom side (i.e., a location adjacent to the torque converter). This means that the terms "top" and "bottom" do not represent the up-down direction of the vehicle. Fastening the pump body 8, the top cover 9, and the bottom cover 7 to each other with bolts, for example, provides the housing 6 including the pump body 8, the top cover 9, and the bottom cover 7 integral with each other, and secures the housing 6 to the transmission case 17.

The top cover 9 and the bottom cover 7 are respectively provided with a shaft hole 92 and a shaft hole 76 into which the pump shaft 2 is inserted such that the pump shaft 2 passes through the top cover 9 and the pump body 8. The top cover 9 and the bottom cover 7 support the pump shaft 2 via needle bearings disposed in the shaft holes 92 and 76 such that the pump shaft 2 is rotatable. The bottom of the shaft hole 76 is provided with a discharge passage 77 through which oil that has leaked from a gap between the drive gear 3 and the pump body 8 is discharged to the outside of the housing 6.

The bottom cover 7 is provided with the suction oil passage 70 and the discharge oil passage 74. The pump body 8 is provided with: a bottom side opening 82s through which the gear housing chamber 82 is in communication with the suction oil passage 70; and a top side opening 94 facing a top side suction oil passage 91 (which will be described below). The bottom side opening 82s and the top side opening 94 are open to the gear housing chamber 82 such that the drive gear 3 and the driven gear 4 are exposed as viewed in the axial direction. The bottom side opening 82s corresponds to a first opening through which oil is sucked into the rotor chamber from a first side of the axial direction. The top side suction oil passage 91 corresponds to a second opening through which oil is sucked into the rotor chamber from a second side of the axial direction. The pump body 8 according to the present embodiment is provided with at least the first opening through which oil is sucked into the rotor chamber.

The pump body 8 is further provided with a discharge side opening 82d at which the gear housing chamber 82 is open to the discharge oil passage 74. Thus, oil that has flowed into the bottom cover 7 through the suction port S1 and the receiving port S2 moves in the first axial direction A1 so as to reach the bottom side opening 82s. In accordance with rotation of the pump shaft 2, the oil is subsequently sucked into a cell c1 that is a pump chamber (oil chamber) defined between the external teeth of the drive gear 3 and the internal teeth of the driven gear 4. When the cell c1 reaches the discharge side opening 82d, the oil is pushed out in the second axial direction A2 and discharged to the discharge oil passage 74. Consequently, in accordance with rotation of the pump shaft 2, the oil pump 1 sucks and pressurizes oil stored in the reservoir 18 and oil flowing from the hydraulic controller 12 and then discharges pressure oil to the hydraulic controller 12.

The suction oil passage 70 is in communication with the top side opening 94 of the gear housing chamber 82 through: a bypass oil passage 83 provided behind (i.e., radially outward of) a support 81 in sliding contact with the outer peripheral surface of the driven gear 4; and the top side suction oil passage 91 provided in the top cover 9. The bypass oil passage 83 and the top side suction oil passage 91 provide an auxiliary suction oil passage 80 through which a portion of oil that has flowed into the suction oil passage 70 flows through a region radially outward of the gear housing chamber 82 and is sucked into the gear housing chamber 82. The auxiliary suction oil passage 80 corresponds to a third oil passage that branches off from a first oil passage (which will be described below) and is connected to the top side opening 94 (second opening). The support 81 corresponds to a partition whose inner peripheral surface faces the gear housing chamber 82 and whose outer peripheral surface defines the third oil passage.

[Detailed Description of Structure of Suction Oil Passage]

Figure 3:
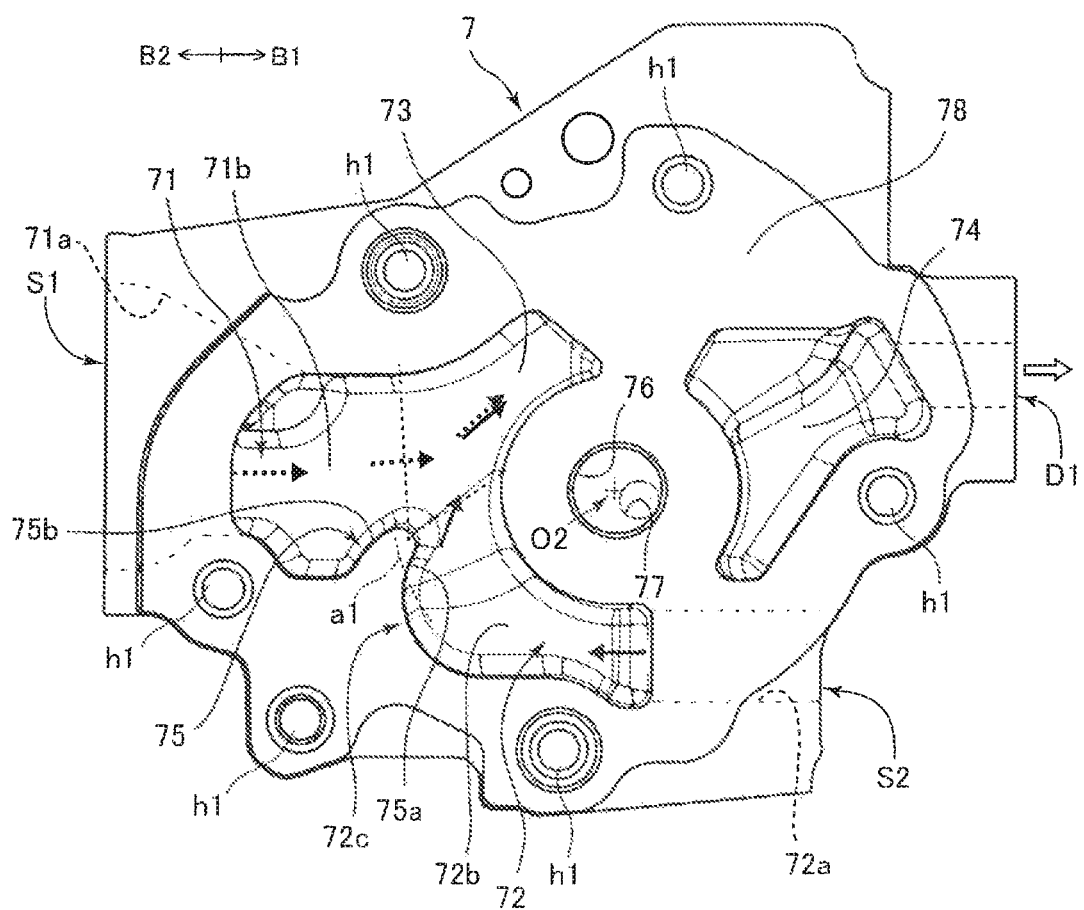
FIG. 3 is a plan view of a bottom cover of the oil pump according to the present embodiment as viewed in an axial direction.
Figure 4A:
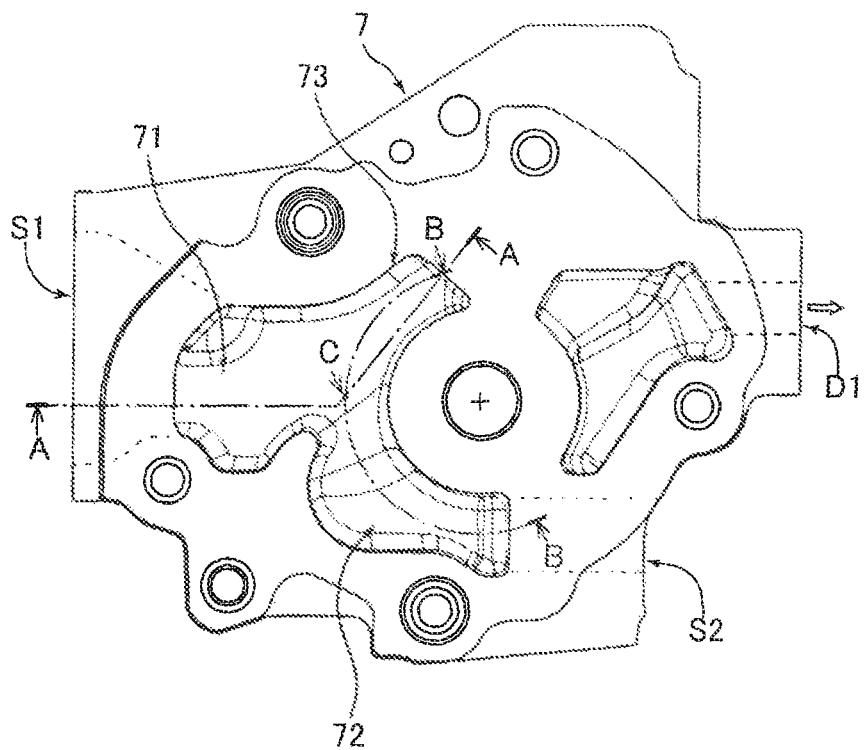
FIG. 4A is a plan view of the rear cover of the oil pump according to the present embodiment as viewed in the axial direction.
Figure 4B:
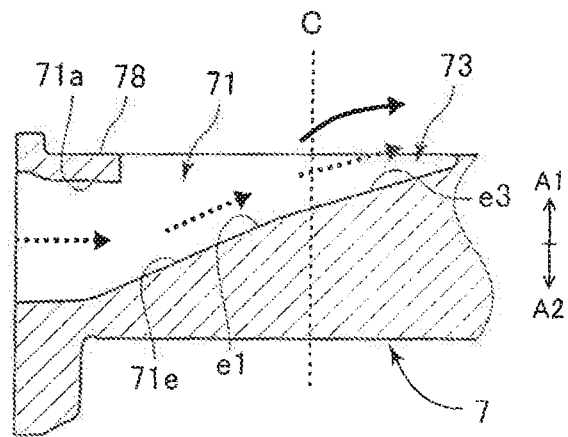
FIG. 4B is a cross-sectional view of the bottom cover taken along the line A-A in FIG. 4A.
Figure 4C:
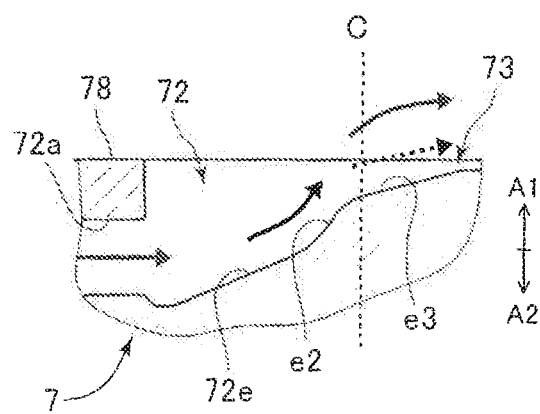
FIG. 4C is a cross-sectional view of the bottom cover taken along the line B-B in FIG. 4A.

The structure of the suction oil passage 70 will be described in detail below with reference to FIGS. 3 to 4C. Note that each of FIGS. 3 and 4A is a plan view of the bottom cover 7 removed from the pump body 8, as viewed from the first axial direction A1 side. Each of FIGS. 4B and 4C is a cross-sectional view of the bottom cover 7 illustrated in FIG. 4A. For convenience of description, depending on a course that oil (ATF) flowing into the oil pump 1 follows, the oil is divided into: "stored oil" that is sucked into the oil pump 1 from the reservoir 18 through the strainer 11; and "refluxed oil" that is refluxed to the oil pump 1 from the hydraulic controller 12. In FIGS. 3, 4A, 4B, and 4C, arrows in solid lines indicate exemplary directions in which the refluxed oil flows, and arrows in broken lines indicate exemplary directions in which the stored oil flows. A direction perpendicular to the axial direction includes: a first width direction B1 that is a direction toward the hydraulic controller 12 relative to the pump shaft 2; and a second width direction B2 that is a direction toward the strainer 11 relative to the pump shaft 2. Both of the width directions may be referred to as a "width direction" without any distinction therebetween.

As illustrated in FIG. 3, the bottom cover 7 is provided with the suction oil passage 70, the discharge oil passage 74, the shaft hole 76, and a plurality of bolt holes h1 into which fastening bolts for the housing 6 are inserted. The suction oil passage 70 and the discharge oil passage 74 are each provided by a combination of: a groove shape recessed from a smooth top surface 78 that is a surface of the bottom cover 7 bonded to the pump body 8; and a tubular shape passing through the inside of the bottom cover 7.

The suction oil passage 70 includes: a first oil passage 71 (suction oil passage) that is a stored oil flow path; and a second oil passage 72 (reflux oil passage) that is a reflux oil flow path. Downstream portions of the first oil passage 71 and the second oil passage 72 define a junction 73 that is a shared oil passage for the stored oil and the reflux oil. As used herein, the term "junction 73" refers to a region where oil flowing from the first oil passage 71 and oil flowing from the second oil passage 72 merge during operation of the oil pump 1, with consideration given to the shapes of the oil passages. In one example, the junction may be an oil passage formed such that when viewed in the axial direction, the oil passage is located downstream of planes passing through an end of a protrusion 75, serving as a partition between the first oil passage 71 and the second oil passage 72, and substantially perpendicular to the directions of oil flow through the oil passages 71 and 72. In this example, with consideration given to the inclinations of bottom surfaces 71e and 72e (which will be described below), the junction is provided by an oil passage located downstream of a plane passing through the end of the protrusion 75 and substantially perpendicular to the first oil passage 71 and a plane passing through the protrusion 75 and a portion of the bottom surface 72e of the second oil passage 72 substantially equal in axial height to the bottom surface 71e of the first oil passage 71 (see the broken lines for both of the planes). The stored oil and the reflux oil supplied through these oil passages are sucked into the gear housing chamber 82 in accordance with rotation of the drive gear 3 that rotates in a clockwise direction in FIG. 3. The stored oil flowing through the first oil passage 71 and the reflux oil flowing through the second oil passage 72 merge in an upstream region of the junction 73 in the oil flow direction (clockwise direction). The first oil passage 71 and the second oil passage 72 branch off from the junction 73 and respectively extend to the suction port S1 and the receiving port S2, so that the first oil passage 71 and the second oil passage 72 each connect the bottom side opening 82s of the gear housing chamber 82 to an associated one of the ports S1 and S2. In FIG. 3, the boundary between the junction and the first and second oil passages 71 and 72 is indicated by the broken lines substantially perpendicular to the oil flow direction.

The junction 73 is formed into a groove opened in the first axial direction A1 (i.e., toward the viewer of FIG. 3) at a location where the junction 73 overlaps with the bottom side opening 82s of the gear housing chamber 82 when viewed in the axial direction. The junction 73 circumferentially extends around the shaft axis O2 that is the rotation axis of the pump shaft 2. The junction 73 overlaps with at least a portion of the bottom side opening 82s as viewed in the axial direction.

Referring also to FIG. 4B, the first oil passage 71 includes: a tubular upstream portion 71a whose upper region (facing in the first axial direction A1) is closed; and a groove downstream portion 71b whose upper region is opened. The first oil passage 71 is connected to the suction port S1 through the upstream portion 71a. Referring also to FIG. 4C, the second oil passage 72 includes: a tubular upstream portion 72a whose upper region is closed; and a groove downstream portion 72b whose upper region is opened. The second oil passage 72 is connected to the receiving port S2 through the upstream portion 72a. The downstream portion 71b of the first oil passage 71 and the downstream portion 72b of the second oil passage 72 are each connected to the junction 73 and are each in communication with the bottom side opening 82s of the gear housing chamber 82 through an oil passage provided in the pump body 8.

[First Inclined Region and Second Inclined Region]

The shape of the suction oil passage 70 as viewed in a direction perpendicular to the axial direction will be described below with reference to FIG. 4. Note that FIG. 4B is a cross-sectional view of the suction oil passage 70 (first oil passage 71) taken along the line A-A in FIG. 4A, and FIG. 4C is a cross-sectional view of the suction oil passage 70 (second oil passage 72) taken along the line B-B in FIG. 4A. A reference position C indicated by the broken line is a position where the line A-A and the line B-B intersect. The reference position C is located inside the junction 73.

As described above, the gear housing chamber 82 is disposed in the first axial direction A1 side relative to the suction oil passage 70. Oil in the suction oil passage 70 moves in the first axial direction A1 and is thus sucked into the gear housing chamber 82. Accordingly, as illustrated in FIGS. 4B and 4C, a bottom surface 73e of the junction 73 is formed into a sloped shape that inclines in the first axial direction A1 such that the bottom surface e3 of the junction extends downstream in the rotation direction of the pump shaft 2. In other words, the junction 73 is formed such that the junction 73 becomes shallower as it extends downstream.

As illustrated in FIG. 4B, the bottom surface 71e that is a bottom region of the first oil passage 71 located away from the gear housing chamber 82 in the axial direction (i.e., located in the second axial direction A2 side) is formed into a sloped shape that inclines in the first axial direction A1 such that the bottom surface 71e extends downstream in the direction of flow of the stored oil (i.e., rightward in FIG. 4B). As illustrated in FIG. 4C, the bottom surface 72e that is a bottom region of the second oil passage 72 located away from the gear housing chamber 82 in the axial direction is formed into a sloped shape that inclines in the first axial direction A1 such that the bottom surface 72e extends downstream in the direction of flow of the reflux oil (i.e., rightward in FIG. 4C). Each of the bottom surfaces 71e and 72e is smoothly continuous with the bottom surface e3 of the junction 73.

The bottom surface 71e of the first oil passage 71 is provided with a first inclined region e1 located upstream of the junction 73 (i.e., upstream of the reference position C) and inclined at a predetermined inclination angle. The bottom surface 72e of the second oil passage 72 is provided with a second inclined region e2 located adjacent to the junction 73 and inclined at a predetermined inclination angle. As used herein, the term "predetermined inclination angle" refers to an angle relative to a horizontal plane perpendicular to the axial direction. The predetermined inclination angle of the first inclined region e1 and the predetermined inclination angle of the second inclined region e2 are set to be different. The inclination angles of the first inclined region e1 and the second inclined region e2 are set such that the direction of flow of oil through the oil passages is toward the bottom side opening 82s. In the present embodiment, the inclination angle of the second inclined region e2 is set to be larger than the inclination angle of the first inclined region e1.

The first oil passage 71 and the second oil passage 72 are respectively provided with the inclined regions e1 and e2 inclined at different angles as mentioned above. This causes the stored oil and the reflux oil to flow in such a manner that the flow of the stored oil and the flow of the reflux oil will not collide with each other at the junction 73. The stored oil that has flowed into the first oil passage 71 through the suction port S1 flows into the junction 73 along the first inclined region e1 whose inclination angle is slighter than the inclination angle of the second inclined region e2 (see FIG. 4B). The reflux oil that has flowed into the second oil passage 72 through the receiving port S2 flows into the junction 73 along the second inclined region e2 whose inclination angle is steeper than the inclination angle of the first inclined region e1 (see FIG. 4C). Thus, at the junction 73, the flow of the reflux oil runs onto the flow of the stored oil, so that the reflux oil and the stored oil merge while the reflux oil flows through a region facing in the first axial direction A1 and the stored oil flows through a region facing in the second axial direction A2 (i.e., a bottom side region). In other words, the first oil passage 71 and the second oil passage 72 are configured such that a region of the bottom side opening 82s where the reflux oil flowing along the second inclined region e2 reaches is upstream of a region of the bottom side opening 82s where the stored oil flowing along the first inclined region e1 reaches in the rotation direction of the drive gear 3. This prevents collision of the flow of the reflux oil with the flow of the stored oil so as to reduce disturbance in the flow of oil through the junction 73 and a region downstream thereof.

The reflux oil flowing through the second oil passage 72 is oil as an excess pressure discharged inside the hydraulic controller 12 and refluxed to the oil pump 1. Thus, while hydraulic control that requires a high flow rate, such as changing the state of clutch engagement and/or disengagement in the speed change mechanism 14, is not carried out, a relatively large amount of the reflux oil is refluxed to the second oil passage 72. The momentum of flow of the reflux oil as an excess pressure to be returned to the oil pump 1 is likely to be greater than the momentum of flow of the stored oil flowing into the first oil passage 71 by suction of (i.e., a negative pressure from) the oil pump 1. In short, the flow rate of the reflux oil flowing into the junction 73 tends to be higher than the flow rate of the stored oil.

In the present embodiment, the inclination angle of the second inclined region e2 is set to be larger than the inclination angle of the first inclined region e1, so that at the junction 73, the flow of the reflux oil will be a layer facing in the first axial direction A1 and the flow of the stored oil will be a layer facing in the second axial direction A2. Thus, the reflux oil whose flow rate is relatively high will flow through a region close to the gear housing chamber 82. Consequently, oil is supplied to the gear housing chamber 82 more smoothly than when the reflux oil flows under the flow of the stored oil (i.e., through a region adjacent to the bottom surface of the junction 73).

[Shape of Oil Passage as Viewed in Axial Direction]

Figure 5:
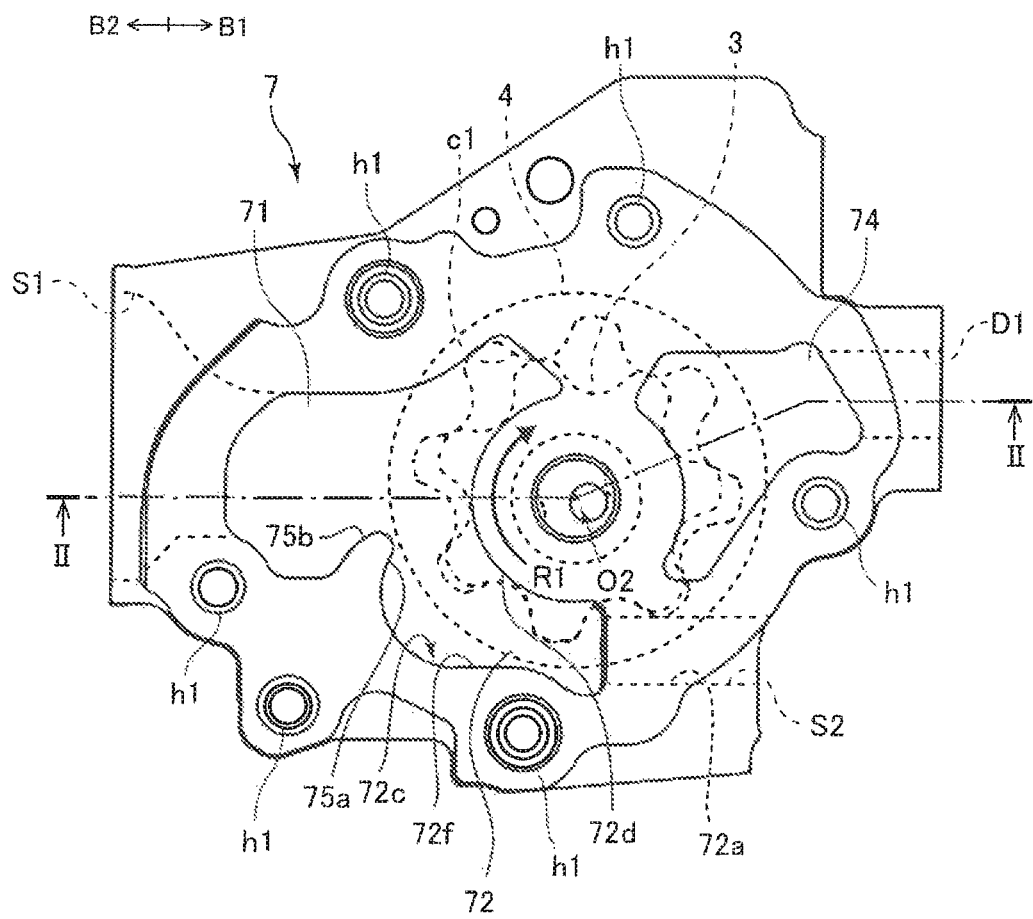
FIG. 5 is a plan view of the bottom cover of the oil pump according to the present embodiment as viewed in the axial direction.
Figure 6:
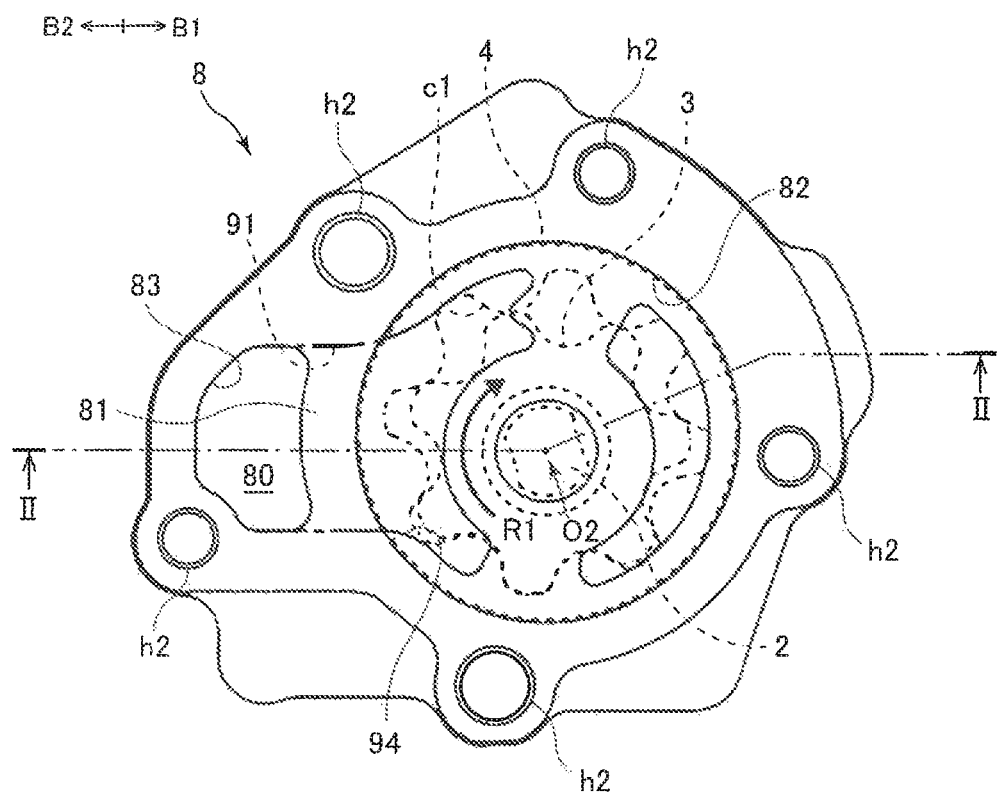
FIG. 6 is a plan view of a pump body of the oil pump according to the present embodiment as viewed in the axial direction.
Figure 7:
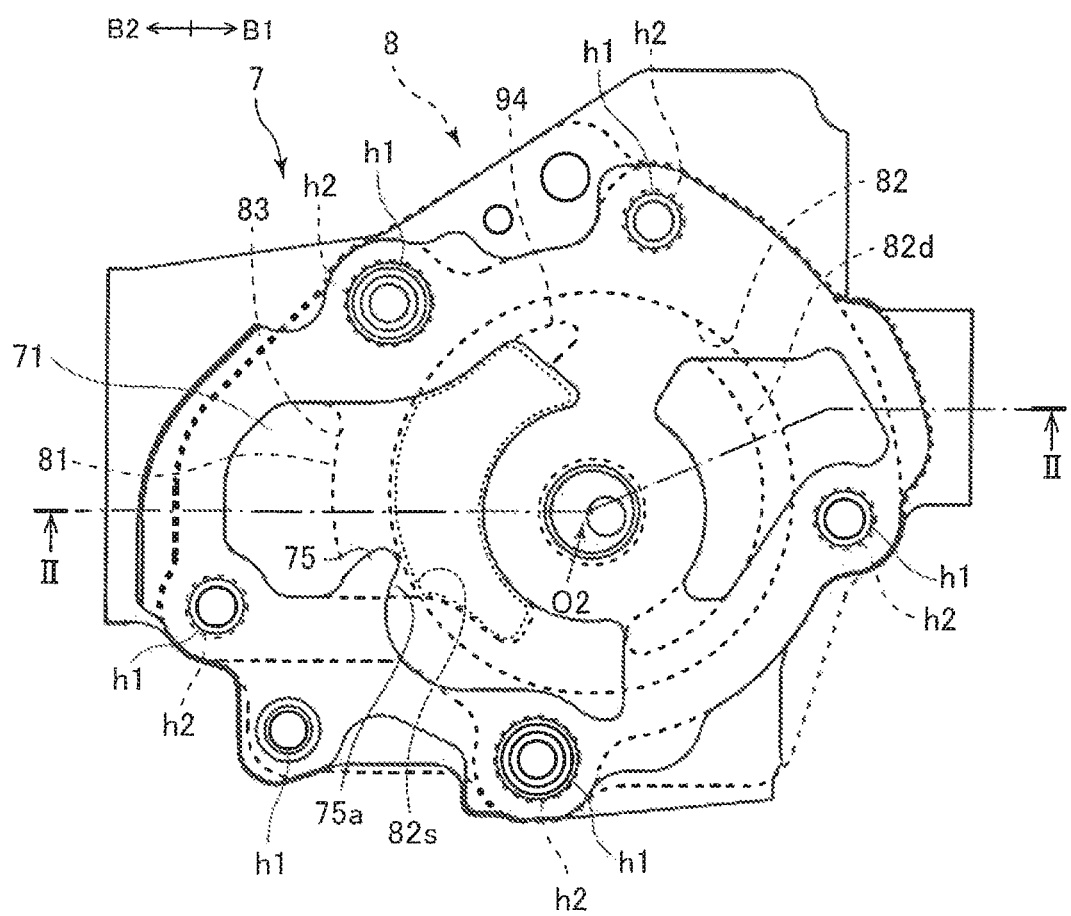
FIG. 7 is a plan view illustrating the positional relationship of oil passages provided in the bottom cover and the pump body of the oil pump according to the present embodiment.

The shape of the suction oil passage 70 as viewed in the axial direction will be described below with reference to FIG. 3 and FIGS. 5 to 7. Note that each of FIGS. 5 and 7 is a plan view of the bottom cover 7 as viewed from the first axial direction, and FIG. 6 is a plan view of the pump body 8 as viewed from the first axial direction A1 side. In FIGS. 5 and 6, the drive gear 3 and the driven gear 4 are indicated by broken lines. In FIGS. 5 to 7, a section corresponding to the cross-sectional view illustrated in FIG. 2 is indicated by broken lines. As illustrated in FIGS. 6 and 7, the pump body 8 is provided with a plurality of bolt holes h2. With the bolt holes h2 aligned with the bolt holes h1 of the bottom cover 7, the pump body 8 and the bottom cover 7 are secured to each other with bolts.

As previously described, the oil pump 1 is disposed between the strainer 11 and the hydraulic controller 12. As illustrated in FIG. 3, the suction port S1 opened in the second width direction B2 and the receiving port S2 opened in the first width direction B1 are disposed such that the shaft axis O2 is located between the suction port S1 and the receiving port S2. As viewed in a direction perpendicular to the axial direction (e.g., from below the bottom cover 7 illustrated in FIG. 3), the suction port S1 is disposed on the same side as the junction 73 relative to the shaft axis O2, while the receiving port S2 is disposed opposite to the junction 73. Thus, the first oil passage 71 is formed to extend linearly from the suction port S1 to the junction 73, while the second oil passage 72 is formed to extend around the pump shaft 2.

The second oil passage 72 according to the present embodiment is formed to curve such that the second oil passage 72 extends around the shaft hole 76, into which the pump shaft 2 is inserted, in the rotation direction of the pump shaft 2 (e.g., in the clockwise direction). Accordingly, the second oil passage 72 is connected to the junction 73 such that the reflux oil flows downstream in the rotation direction of the drive gear 3. The first oil passage 71 that joins with the junction 73 from a radially outward position and the second oil passage 72 that joins with the junction 73 from a radially inward position are separated by the protrusion 75 located upstream of the junction 73. The protrusion 75 is disposed such that an inner wall 75a of the protrusion 75 located radially inward relative to the shaft axis O2 faces the second oil passage 72 and an outer wall 75b of the protrusion 75 located radially outward relative to the shaft axis O2 faces the first oil passage 71. The protrusion 75 is radially inwardly inclined and protruded in a rotation direction R1 of the drive gear 3. Thus, assuming that the suction oil passage 70 extends upstream in the direction of flow of the stored oil and in the direction of flow of the reflux oil from the junction 73, the first oil passage 71 and the second oil passage 72 that are separated by the protrusion 75 branch off from the junction 73.

As illustrated in FIG. 5, the first oil passage 71 and the second oil passage 72 join in an area that overlaps with the path of rotation of the drive gear 3 and the path of rotation of the driven gear 4 as viewed in the axial direction. The first oil passage 71 extends in a substantially radial direction relative to the shaft axis O2, but the second oil passage 72 is formed to curve such that the second oil passage 72 extends around the pump shaft 2 in the rotation direction R1 of the pump shaft 2 (i.e., in the clockwise direction). Specifically, the upstream portion 72a of the second oil passage 72 extends past the shaft axis O2 in the width direction, i.e., in the second width direction B2, from the receiving port S2, and the downstream portion 72b of the second oil passage 72 is formed to be a curved oil passage curved in the rotation direction R1 of the drive gear 3. The downstream portion 72b of the second oil passage 72 includes a wall surface 72d located radially inward relative to the shaft axis O2, and a wall surface (72c) located radially outward relative to the shaft axis O2. These wall surfaces are each curved in the rotation direction R1 of the drive gear 3.

In particular, the radially inward wall surface 72d is formed into a substantially circumferential surface, but the curved surface 72c that is the radially outward wall surface has a radially outwardly bulged shape. Specifically, unlike the outline of the gear housing chamber 82 (i.e., the outer periphery of the driven gear 4) as viewed in the axial direction, the curved surface 72c is formed such that its upstream region 72f extends radially outward and its downstream region (75a) extends radially inward. Thus, the inner wall 75a of the protrusion 75 that is a downstream region of the curved surface 72c is inclined radially inward in the rotation direction of the drive gear 3 (i.e., in the clockwise direction) relative to the direction of a tangent to a circle drawn around the shaft axis O2 (see the dotted line a1). The upstream portion 72a of the second oil passage 72 extends in the second width direction B2, while the inner wall 75a of the protrusion 75 is curved toward the first width direction B1 so as to extend downstream in the direction of flow of the reflux oil. The outer wall 75*b* of the protrusion 75 extends in the rotation direction of the drive gear 3 and thus functions as a wall along which the stored oil flows downstream in the rotation direction.

Although the curved surface 72*c* according to the present embodiment has been described on the assumption that the curved surface 72*c* is curved smoothly, the curved surface 72*c* may have a substantially curved shape provided by connecting flat surfaces having different angles. Alternatively, the curved surface 72*c* may be provided on a member other than a protruding member such as the protrusion 75, as long as the downstream region of the curved surface 72*c* is formed to extend radially inward.

The positional relationship between the first and second oil passages 71 and 72 and the auxiliary suction oil passage 80 that is the third oil passage will be described below. As illustrated in FIG. 6, the support 81 serving as a partition includes: an inner peripheral surface supporting the driven gear 4; and an outer peripheral surface defining the bypass oil passage 83 that is a portion of the auxiliary suction oil passage 80. As illustrated in FIGS. 2 and 7, the bypass oil passage 83 branches off from the first oil passage 71 in the first axial direction A1. As illustrated in FIG. 7, the protrusion 75 and the support 81 are disposed to partially overlap with each other as viewed in the axial direction. An end of the protrusion 75 in the first axial direction A1 is connected to an end of the support 81 in the second axial direction A2.

Because the second oil passage 72 according to the present embodiment is provided with the curved surface 72*c* described above, the reflux oil flowing through the upstream portion 72*a* of the second oil passage 72 in the second width direction B2 changes its flow direction along the curved surface 72*c*, so that the reflux oil reaches the bottom side opening 82*s* while flowing in the rotation direction R1 of the drive gear 3. Specifically, assuming that oil flows in directions facing each other through the two suction ports (S1, S2), the reflux oil whose pressure is higher than the pressure of the stored oil reaches the bottom side opening 82*s* while flowing in the rotation direction R1 of the drive gear 3. For example, suppose that the reflux oil flows in a direction opposite to the rotation direction R1 of the drive gear 3 and merges with the stored oil. In such a case, the reflux oil receives, from the drive gear 3, a shearing force applied in a direction opposite to the flow direction as viewed in the axial direction, resulting in oil flow disturbance. The structure of the present embodiment, however, minimizes the shearing force received from the drive gear 3, making it possible to reduce the oil flow disturbance. The curved oil passage (72*b*) causes the direction of flow of the reflux oil as viewed in the axial direction to approach the direction of flow of the stored oil (first width direction B1). This prevents collision of the flow of the reflux oil with the flow of the stored oil so as to smoothly supply the oil to the gear housing chamber 82.

The inner wall 75*a* of the protrusion 75 that is the downstream region of the curved surface 72*c* is formed to be an inclined surface inclined radially inward toward the shaft axis O2. Thus, the reflux oil flowing along the curved surface 72*c* will be directed toward the center (i.e., the root of teeth) of the drive gear 3. This enables the oil to be stably supplied to the radially inner region of the cell c1 that is likely to be lower in pressure than the radially outer region of the cell c1 owing to centrifugal force generated by rotation of the drive gear 3. In addition, cavitation in the radially inner region of the cell c1 is unlikely to occur.

The downstream portion 72*b* of the second oil passage 72 is provided such that its flow path sectional area decreases as the downstream portion 72*b* extends closer to the junction 73. Specifically, the inclination of the second inclined region e2 (see FIG. 4C) and the shape of the inner wall 75*a* of the protrusion 75 (see FIG. 5) cause the sectional area of the second oil passage 72 in a cross section passing through the shaft axis O2 to decrease as the second oil passage 72 extends along the inner wall 75*a* in the rotation direction R1 of the drive gear 3. Thus, the velocity of flow of the reflux oil directed toward the bottom side opening 82*s* by the inner wall 75*a* and the second inclined region e2 is higher than when the sectional area of the second oil passage 72 is substantially constant. The stored oil is drawn into the flow of the reflux oil at the junction 73, and the first oil passage 71 is replenished with the stored oil flowing from the strainer 11 accordingly. Consequently, as the velocity of flow of the reflux oil increases, the effect of drawing the stored oil is enhanced, so that rotational resistance of the drive gear 3 decreases. This eventually reduces a drive load on the oil pump 1.

Summary of Present Embodiment

A power transmission apparatus (PT) according to the present embodiment includes:

an input shaft (10) drivingly coupled by a driving source (E);

a speed change mechanism (14) to change a speed of rotation of the input shaft (10) and transmit the resulting rotation;

a hydraulic controller (12) to adjust pressure of oil and supply the resulting oil to the speed change mechanism (14);

a reservoir (18) storing oil; and an oil pump (1) including a rotor (3) and a housing (6) provided with a rotor chamber (82) housing the rotor (3). The oil pump (1) is configured such that rotation of the rotor (3) causes oil as an excess pressure discharged inside the hydraulic controller (12) and refluxed therefrom and oil sucked from the reservoir (18) through a strainer (11) to be sucked into a pump chamber (c1) defined by the rotor (3), and the oil sucked into the pump chamber (c1) is pressurized and supplied to the hydraulic controller (12).

The oil pump (1) is disposed between the hydraulic controller (12) and the strainer (11) as viewed in an axial direction of the rotor (3).

The housing (6) is provided with: a first oil passage (71) through which the oil sucked through the strainer (11) is supplied to the pump chamber (c1); and a second oil passage (72) through which the oil refluxed from the hydraulic controller (12) is supplied to the pump chamber (c1).

The second oil passage (72) includes a curved oil passage (72*b*) curved along the rotor (3). The oil refluxed from the hydraulic controller (12) flows in a rotation direction (R1) of the rotor (3) through the curved oil passage (72*b*).

Assuming that oil flows into a plurality of oil passages provided in the housing of the oil pump in directions facing each other, this structure causes the oil refluxed from the hydraulic controller to be supplied to the pump chamber defined by the rotor, with the flow of the oil directed in the rotation direction of the rotor. Thus, the oil sucked from the reservoir merges with the oil flowing from the hydraulic controller while flowing along the oil flowing from the hydraulic controller. This reduces oil flow disturbance caused by merging of the oil, resulting in improvement in stability of discharge pressure and improvement in durability of the oil pump.

The first oil passage (71) of the power transmission apparatus (PT) according to the present embodiment preferably joins with the second oil passage (72b) at a location downstream of the curved oil passage (72b) in the rotation direction of the rotor (3).

This structure causes the oil sucked from the stored oil to merge with the oil refluxed from the hydraulic controller and flowing along the curved oil passage. Thus, collision of the oil flowing through the two oil passages in directions facing each other is prevented so as to allow smooth merging of the oil. This reduces oil flow disturbance caused by merging of the oil.

The housing (6) of the power transmission apparatus (PT) according to the present embodiment preferably includes a curved surface (72c) extending along a wall surface of the curved oil passage (72b) located radially outward of the rotor shaft (2). The curved surface (72c) is preferably curved such that a downstream region (75a) of the curved surface (72c) in the rotation direction of the rotor (3) extends radially inward and downstream in the rotation direction of the rotor (3) relative to a segment of a circle drawn around a rotation axis (O2) of the rotor (3).

This structure causes the oil flowing from the hydraulic controller to flow to the rotor chamber along the shape of the curved surface provided on the second oil passage, with the oil directed radially inward toward the rotation axis of the rotor. Thus, the oil is stably supplied to the radially inner region of the rotor-defined oil chamber that is likely to be reduced in pressure owing to centrifugal force generated by rotation of the rotor. This effectively reduces occurrence of cavitation.

The first oil passage (71) of the power transmission apparatus (PT) according to the present embodiment preferably includes a wall (75b) along which the oil sucked through the strainer (11) flows downstream in the rotation direction of the rotor (3).

This structure causes the oil sucked from the reservoir and flowing downstream in the rotation direction of the rotor along the wall to merge with the oil refluxed from the hydraulic controller. Coupled with the advantage that the oil from the hydraulic controller flows downstream in the rotation direction of the rotor along the curved oil passage, this structure prevents collision of the oil flowing through the two oil passages so as to enable smoother merging of the oil.

The second oil passage (72) of the power transmission apparatus (PT) according to the present embodiment is preferably provided such that the sectional area of the second oil passage (72) in a cross section passing through a rotation axis (O2) of the rotor (3) decreases as the second oil passage (72) extends downstream in the rotation direction of the rotor (3) along a downstream region of the curved oil passage (72b).

This structure increases the velocity of flow of oil flowing downstream from the curved portion of the second oil passage, thus enhancing the effect of drawing the oil flowing from the reservoir. This reduces rotational resistance of the rotor necessary for suction of oil from the reservoir so as to reduce a drive load on the oil pump.

The housing (6) of the power transmission apparatus (PT) according to the present embodiment is preferably provided with: a first opening (82s) disposed on a first side of the axial direction of the rotor chamber (82) and facing the first oil passage (71) and the second oil passage (72); and a second opening (94) disposed on a second side of the axial direction of the rotor chamber (82).

The housing (6) preferably includes a partition (81) facing the rotor chamber (82) defined around a rotation axis (O2) of the rotor (3) and located radially inward of the partition (81). The partition (81) preferably defines a third oil passage (80) connecting the first oil passage (71) to the second opening (94) at a radially outward location.

At least a portion of a radially outward wall surface of the curved oil passage (72b) is preferably disposed to overlap with the partition (81) as viewed in the axial direction and connected at its axial end to the partition (81).

With the radially outward wall surface of the curved oil passage and the partition, this structure makes it difficult for the oil flowing through the second oil passage to flow into the third oil passage. Thus, the oil that is flowing from the hydraulic controller and higher in pressure than the oil flowing from the reservoir will be directly guided to the first opening. This reduces a drive load on the oil pump.

The housing (6) of the power transmission apparatus (PT) according to the present embodiment preferably includes a protrusion (75) protruding downstream in the rotation direction of the rotor (3) as viewed in the axial direction. The protrusion (75) preferably includes: an outer surface (75b) facing the first oil passage (71) at a radially outward location relative to a rotation axis (O2) of the rotor (3); and an inner surface (75a) facing the second oil passage at a radially inward location.

The inner surface (75a) preferably defines at least a portion of a radially outward wall surface of the curved oil passage (72b).

This structure causes, with the inner surface of the protrusion, the oil flowing through the second oil passage to be directed in the rotation direction of the rotor, and causes, with the outer surface of the protrusion, the oil flowing through the first oil passage to be directed in the rotation direction of the rotor. Thus, this structure more effectively reduces disturbance in the flow of oil merging in a region downstream of the protrusion.

The housing (6) of the power transmission apparatus (PT) according to the present embodiment is preferably provided with an opening (82s) which is disposed on a first side of the axial direction of the rotor chamber (82) and through which the pump chamber (c1) is exposed as viewed in the axial direction.

A portion of a bottom of the first oil passage (71) located away from the rotor chamber (82) in the axial direction is preferably provided with a first inclined region (e1) inclined such that oil flowing along the first inclined region (e1) is directed toward the opening (82s).

A portion of a bottom of the second oil passage (72) located away from the rotor chamber (82) in the axial direction is preferably provided with a second inclined region (e2) inclined such that oil flowing downstream along the second inclined region (e2) is directed toward a region of the opening (82s) located upstream of the first inclined region (e1).

This structure causes the oil flowing from the second oil passage to flow above the oil flowing from the first oil passage, so that the oil flowing from the second oil passage is likely to be sucked into the rotor chamber more smoothly than the oil flowing from the first oil passage. Thus, the oil that is refluxed to the oil pump from the hydraulic controller and higher in pressure than the oil sucked into the oil pump from the reservoir is smoothly supplied to the rotor chamber. This reduces a drive load on the oil pump.

The housing (6) of the power transmission apparatus (PT) according to the present embodiment is preferably provided with: a first suction port (S1) disposed to face the strainer

(11) and connected to the strainer (11); a second suction port (S2) disposed to face the hydraulic controller (12) and connected to the hydraulic controller (12); and an opening (82s) which is disposed on a first side of the axial direction of the rotor chamber (82) and through which the pump chamber (c1) is exposed as viewed in the axial direction.

The first oil passage (71) preferably connects the first suction port (S1) to the opening (82s). The second oil passage (72) preferably connects the second suction port (S2) to the opening (82s).

This structure simplifies the arrangement of the oil passages through which the oil pump is connected to the strainer and the hydraulic controller, because the first suction port is disposed to face the strainer and the second suction port is disposed to face the hydraulic controller.

The oil pump (1) of the power transmission apparatus (PT) according to the present embodiment preferably includes a rotor shaft (2) that rotates together with the rotor (3). The rotor shaft (2) is preferably disposed in parallel with the input shaft (10). The rotor (3) is preferably rotated by providing power from the driving source (E) to the rotor shaft (2) through a transmission member (2c) that drivingly couples the input shaft (10) to the rotor shaft (2).

This structure involves disposing the oil pump on an axis different from the axis of the input shaft so as to compactly dispose the speed change mechanism and a mechanism including the oil pump and increase design flexibility.

The power transmission apparatus (PT) according to the present embodiment preferably includes a case (17) housing the speed change mechanism (14).

The hydraulic controller (12) is preferably disposed on a lateral surface of the case (17).

The reservoir (18) is preferably provided in a lower portion of the case (17).

The oil pump (1) is preferably disposed below the input shaft (10).

This structure involves disposing the oil pump close to the lower portion of the case where oil is stored. This reduces a load necessary to pump up oil from the reservoir and thus reduces a drive load on the oil pump.

The power transmission apparatus (PT) according to the present embodiment is preferably configured such that the rotor (3) of the oil pump (1) is a drive gear (3) including external teeth.

The oil pump (1) preferably includes a driven gear (4) that includes internal teeth meshing with the external teeth. The driven gear (4) is preferably housed in the rotor chamber (82) so as to be eccentric relative to the drive gear (3). The driven gear (4) is preferably configured to rotate in accordance with rotation of the drive gear (3).

This structure reduces occurrence of cavitation when the oil pump is an internal gear pump configured to suck oil into the oil chamber defined between the drive gear and the driven gear housed in the rotor chamber, so as to pressurize the oil.

The housing (6) of the power transmission apparatus (PT) according to the present embodiment preferably includes: a pump body (8) provided with the rotor chamber (82); and a cover body (7) secured to the pump body (8) so as to cover a first side of the axial direction of the pump body (8). The cover body (7) is preferably provided with the first oil passage (71) and the second oil passage (72).

This structure involves separately manufacturing the pump body and the cover body and assembling the pump body and the cover body to each other, thus facilitating manufacture of the housing having a complicated three-dimensional shape.

Other Embodiments

Although the oil pump 1 is used as a trochoid internal gear pump in the foregoing embodiment, a seal member (e.g., a crescent) may be interposed between the drive gear and the driven gear, or the oil pump 1 may be used as a vane pump including radially movable vanes housed in grooves provided in a rotor. In short, the oil pump 1 is only required to be configured such that rotation of the rotor housed in the rotor chamber (gear housing chamber) causes oil flowing into the junction through the first oil passage and oil flowing into the junction through the second oil passage to at least partially merge at the junction, and the oil merged is sucked into and pressurized in the oil chamber (pump chamber) defined by the rotor.

In the foregoing embodiment, the upstream portion 71a of the first oil passage 71 and the upstream portion 72a of the second oil passage 72 are provided such that the oil flowing through the upstream portion 71a and the oil flowing through the upstream portion 72a are flowing in the opposite directions. The first oil passage 71 and the second oil passage 72 may be provided to extend in any other directions as long as the suction port S1 is disposed on the same side as the junction 73 relative to the shaft axis O2 and the receiving port S2 is disposed opposite to the junction 73. The second oil passage 72 does not necessarily have to be curved so as to extend around the shaft axis O2 as viewed in the axial direction. In one example, the second oil passage 72 may join with the junction from the first side of the axial direction. In such cases as well, providing a return portion through which oil temporarily flowing away from the location of the junction relative to the shaft axis O2 is returned to the junction achieves effects similar to those of the present embodiment.

INDUSTRIAL APPLICABILITY

The power transmission apparatus according to the present invention is usable for all types of driving apparatuses used in, for example, various transportation apparatuses (e.g., automobiles), industrial apparatuses, and production machines.

DESCRIPTION OF THE REFERENCE NUMERALS 1 oil pump
2 pump shaft (rotor shaft)
3 rotor, drive gear
4 driven gear
6 housing
7 cover body (bottom cover)
8 pump body
10 input shaft (drive shaft)
11 strainer
12 hydraulic controller
14 speed change mechanism
17 case (transmission case)
18 reservoir
70 suction oil passage
71 first oil passage
72 second oil passage
72b curved oil passage (downstream region of second oil passage)
72c curved surface
75 protrusion
75b wall 81 partition (support)
82 rotor chamber (gear housing chamber)
82s opening, first opening (bottom side opening)
94 second opening (top side opening)
c1 pump chamber (cell, oil chamber)
e1 first inclined region
e2 second inclined region
AT transmission (automatic transmission)
E driving source, motor (engine)
O2 rotation axis (shaft axis)
PT power transmission apparatus
S1 first suction port (suction port)
S2 second suction port (receiving port)

The invention claimed is:

1. A power transmission apparatus comprising:
an input shaft drivingly coupled by a driving source;
a transmission mechanism to transmit a driving force from the input shaft;
a hydraulic controller to adjust pressure of oil and supply resulting oil to the transmission mechanism;
a reservoir storing oil; and
an oil pump including a rotor and a housing provided with a rotor chamber housing the rotor, the oil pump being configured such that rotation of the rotor causes oil as an excess pressure discharged inside the hydraulic controller and refluxed therefrom and oil sucked from the reservoir through a strainer to be sucked into a pump chamber partitioned by the rotor, and the oil sucked into the pump chamber is pressurized and supplied to the hydraulic controller, wherein
the oil pump is disposed between the hydraulic controller and the strainer as viewed in an axial direction of the rotor,
the housing is provided with a first oil passage through which the oil sucked through the strainer is supplied to the pump chamber, and a second oil passage through which the oil refluxed from the hydraulic controller is supplied to the pump chamber, and
the second oil passage includes a wall surface curved along a rotation direction of the rotor at a position radially outward of an axis of the rotor, so that the oil refluxed from the hydraulic controller flows in a rotation direction of the rotor along the wall surface,
the first oil passage is configured to merge with the second oil passage at a downstream end of the second oil passage in a flow direction of the oil refluxed from the hydraulic controller,
the housing is provided with an opening which is disposed on a first side of the axial direction of the rotor chamber and through which the pump chamber is exposed as viewed in the axial direction,
a portion of a bottom of the first oil passage located away from the rotor chamber in the axial direction is provided with a first inclined region inclined toward the opening in the axial direction,
a portion of a bottom of the second oil passage located away from the rotor chamber in the axial direction is provided with a second inclined region inclined toward the opening in the axial direction and toward a downstream end of the rotation direction of the rotor, and
a second inclined angle of the second inclined region against a vertical plane that is perpendicular to the axial direction is lamer than a first inclined angle of the first inclined region against the vertical plane.

2. The power transmission apparatus according to claim 1, wherein
the first oil passage merges with the second oil passage at a location downstream of the wall surface of the second oil passage.

3. The power transmission apparatus according to claim 1, wherein
the wall surface is curved such that a downstream region of the wall surface in the rotation direction of the rotor extends radially inward.

4. The power transmission apparatus according to claim 3, wherein
the first oil passage includes a wall along which the oil sucked through the strainer flows downstream in the rotation direction of the rotor.

5. The power transmission apparatus according to claim 4, wherein
the second oil passage is provided such that a sectional area of the second oil passage in a cross section passing through the axis of the rotor decreases as the second oil passage extends downstream in the rotation direction of the rotor along a downstream region of the wall surface.

6. The power transmission apparatus according to claim 5, wherein
the housing is provided with a second opening disposed on a second side of the axial direction of the rotor chamber,
the housing includes a partition facing the rotor chamber defined around the axis of the rotor and located radially outward of the rotor chamber, the partition defining a third oil passage connecting the first oil passage to the second opening at a radially outward location, and
at least a portion of a radially outward wall surface of the curved oil passage is disposed to overlap with the partition as viewed in the axial direction and is connected at its axial end to the partition.

7. The power transmission apparatus according to claim 6, wherein
the housing includes a protrusion protruding downstream in the rotation direction of the rotor as viewed in the axial direction, the protrusion including an outer surface facing the first oil passage at a radially outward location relative to a rotation axis of the rotor, and an inner surface facing the second oil passage at a radially inward location, and
the inner surface defines at least a portion of a radially outward wall surface of the wall surface.

8. The power transmission apparatus according to claim 1, wherein
the housing is provided with a first suction port disposed to face the strainer and connected to the strainer, a second suction port disposed to face the hydraulic controller and connected to the hydraulic controller, and an opening which is disposed on a first side of the axial direction of the rotor chamber and through which the pump chamber is exposed as viewed in the axial direction, and
the first oil passage connects the first suction port to the opening, and the second oil passage connects the second suction port to the opening.

9. The power transmission apparatus according to claim 8, wherein
the oil pump includes a rotor shaft that rotates together with the rotor, the rotor shaft being disposed in parallel with the input shaft, the rotor being rotated by providing power from the driving source to the rotor shaft through a transmission member that drivingly couples the input shaft to the rotor shaft.

10. The power transmission apparatus according to claim 9, the apparatus comprising a case housing the transmission mechanism, wherein
the hydraulic controller is disposed on a lateral surface of the case,
the reservoir is provided in a lower portion of the case, and
the oil pump is disposed below the input shaft.

11. The power transmission apparatus according to claim 10, wherein
the rotor is a drive gear including external teeth, and
the oil pump includes a driven gear that includes internal teeth meshing with the external teeth, the driven gear being housed in the rotor chamber so as to be eccentric relative to the drive gear, the driven gear being configured to rotate in accordance with rotation of the drive gear.

12. The power transmission apparatus according to claim 11, wherein
the housing includes a pump body provided with the rotor chamber, and a cover body secured to the pump body so as to cover a first side of the axial direction of the pump body, the cover body being provided with the first oil passage and the second oil passage.

13. The power transmission apparatus according to claim 1, wherein
the first oil passage includes a wall along which the oil sucked through the strainer flows downstream in the rotation direction of the rotor.

14. The power transmission apparatus according to claim 13, wherein
the second oil passage is provided such that a sectional area of the second oil passage in a cross section passing through the axis of the rotor decreases as the second oil passage extends downstream in the rotation direction of the rotor along a downstream region of the wall surface.

15. The power transmission apparatus according to claim 1 wherein
the second oil passage is provided such that a sectional area of the second oil passage in a cross section passing through the axis of the rotor decreases as the second oil passage extends downstream in the rotation direction of the rotor along a downstream region of the wall surface.

16. The power transmission apparatus according to claim 1, wherein
the housing is provided with a second opening disposed on a second side of the axial direction of the rotor chamber,
the housing includes a partition facing the rotor chamber defined around the axis of the rotor and located radially outward of the rotor chamber, the partition defining a third oil passage connecting the first oil passage to the second opening at a radially outward location, and
at least a portion of a radially outward wall surface of the curved oil passage is disposed to overlap with the partition as viewed in the axial direction and is connected at its axial end to the partition.

* * * * *